(12) United States Patent
Rautiainen

(10) Patent No.: US 9,930,541 B2
(45) Date of Patent: Mar. 27, 2018

(54) MAINTAINING THE INTEGRITY OF CONFIGURATION INFORMATION OF A NETWORK OF ACCESS POINTS FOR USE IN POSITIONING AN APPARATUS

(75) Inventor: Terhi Tuulikki Rautiainen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 1074 days.

(21) Appl. No.: 12/810,184

(22) PCT Filed: Dec. 27, 2007

(86) PCT No.: PCT/EP2007/011427
§ 371 (c)(1),
(2), (4) Date: Aug. 10, 2010

(87) PCT Pub. No.: WO2009/083014
PCT Pub. Date: Jul. 9, 2009

(65) Prior Publication Data
US 2010/0309807 A1    Dec. 9, 2010

(51) Int. Cl.
*H04W 64/00* (2009.01)
*H04W 24/00* (2009.01)
*G01S 5/02* (2010.01)
*H04W 4/02* (2018.01)
*H04W 16/22* (2009.01)
*H04W 24/10* (2009.01)

(52) U.S. Cl.
CPC ........... *H04W 24/00* (2013.01); *G01S 5/0289* (2013.01); *H04W 64/00* (2013.01); *H04W 4/02* (2013.01); *H04W 16/22* (2013.01); *H04W 24/10* (2013.01)

(58) Field of Classification Search
None
See application file for complete search history.

(56) References Cited

U.S. PATENT DOCUMENTS

| 7,139,583 | B2 * | 11/2006 | Yamasaki et al. | 455/456.1 |
| 7,286,835 | B1 * | 10/2007 | Dietrich | H04W 64/00 455/456.1 |
| 2003/0220116 | A1 * | 11/2003 | Sagefalk | H04W 64/00 455/456.1 |

(Continued)

FOREIGN PATENT DOCUMENTS

| EP | 1763164 | 3/2007 |
| WO | WO2008069446 | 6/2008 |

OTHER PUBLICATIONS

International Search Report of PCT/EP2007/011427—Date of Completion of Search: Sep. 10, 2008.

(Continued)

*Primary Examiner* — Jae Y Lee
*Assistant Examiner* — Aixa Guadalupe-Cruz
(74) *Attorney, Agent, or Firm* — Locke Lord LLP

(57) ABSTRACT

A method comprising: collecting from each of multiple access points in a network of access points a set of measurements made at a respective access point for signals transmitted by other access points, wherein the network of access points is for use in positioning a device that communicates with the network of access points; processing the collected sets of measurements to classify changes in the network of access points; and performing an action that is conditional upon how a change is classified.

19 Claims, 3 Drawing Sheets

(56) References Cited

U.S. PATENT DOCUMENTS

2005/0073980 A1* 4/2005 Thomson ............. H04W 16/20
370/338
2005/0143092 A1* 6/2005 Tamaki et al. ............ 455/456.1
2007/0258409 A1* 11/2007 Alizadeh-Shabdiz et al.
................................... 370/331

OTHER PUBLICATIONS

Kamol Kaemarungsi, et al., "Properties of Indoor Received Signal Strength for WLAN Location Fingerprinting", Proceedings of the First Annual International Conference on Mobile and Ubiquitous Systems: Networking and Services (MobiQuitous '04), 2004, 10 pages.

Reetu Singh, et al., "A Novel Positioning System for Static Location Estimation Employing WLAN in Indoor Environment", IEEE, 2004, pp. 1762-1766.

Moustafa Amin Abdel Azim Yousief Abdel Rehim, PhD., "Horus: A WLAN-Based Indoor Location Determination System", Dissertation submitted to the Faculty of the Graduate School of the University of Maryland, College Park, 2004, 127 pages.

* cited by examiner

MAINTAINING THE INTEGRITY OF CONFIGURATION INFORMATION OF A NETWORK OF ACCESS POINTS FOR USE IN POSITIONING AN APPARATUS

FIELD OF THE INVENTION

Embodiments of the present invention relate to positioning. In particular, they relate to maintaining the integrity of data used during a positioning procedure.

BACKGROUND TO THE INVENTION

There are many types of positioning procedures. Typically to position an apparatus using wireless communication there is wireless communication between the apparatus and a network of transceivers of known location. By measuring parameters of the communication such as angle of arrival, time of flight or received power it is possible to position the apparatus using known algorithms.

The accuracy of the positioning process is dependent upon the transceivers being at a known location and, perhaps, having known transmission properties such as power and directional gain.

BRIEF DESCRIPTION OF VARIOUS EMBODIMENTS OF THE INVENTION

According to various embodiments of the invention there is provided a method comprising: collecting from each of multiple access points in a network of access points a set of measurements made at a respective access point for signals transmitted by other access points, wherein the network of access points is for use in positioning a device that communicates with the network of access points; processing the collected sets of measurements to classify changes in the network of access points; and performing an action that is conditional upon how a change is classified.

According to various embodiments of the invention there is provided an apparatus comprising: means for collecting from each of multiple access points in a network of access points a set of measurements made at a respective access point for signals transmitted by other access points, wherein the network of access points is for use in positioning a device that communicates with the network of access points; means for processing the collected sets of measurements to classify changes in the network of access points; and means for performing an action that is conditional upon how a change is classified.

According to various embodiments of the invention there is provided a system comprising: a network of access points for use in positioning a device that communicates with the network of access points; means for collating for each of multiple access points in the network of access points a set of measurements made at a respective access point for signals transmitted by other access points; means for processing the collated sets of measurements to classify changes in the network of access points; and means for performing an action that is conditional upon how a change is classified.

According to various embodiments of the invention there is provided a computer readable medium having a tangibly encoded computer program which when loaded into a computer provides: means for collecting from each of multiple access points in a network of access points a set of measurements made at a respective access point for signals transmitted by other access points, wherein the network of access points is for use in positioning a device that communicates with the network of access points; means for processing the collected sets of measurements to classify changes in the network of access points; and means for performing an action that is conditional upon how a change is classified.

According to various embodiments of the invention there is provided a method of maintaining the integrity of a database that records configuration information of a network of access points for use in positioning an apparatus that communicates with the network of access points comprising: collecting from respective access points a set of measurements made at the respective access point for signals transmitted by other access points; processing the collected sets of measurements to identify a change in the network of access points associated with a particular access point; and automatically adapting the configuration information in the database associated with the particular access point.

According to various embodiments of the invention there is provided an apparatus comprising: a database that records configuration information of a network of access points for use in positioning an apparatus that communicates with the network of access points; means for collecting from respective access points a set of measurements made at the respective access point for signals transmitted by other access points; means for processing the collected sets of measurements to identify a change in the network of access points associated with a particular access point; and means for automatically adapting the configuration information in the database associated with the particular access point.

According to various embodiments of the invention there is provided a computer readable medium having a tangibly encoded computer program which when loaded into a computer provides: means for collating from respective access points a set of measurements made at the respective access point for signals transmitted by other access points; means for processing the collected sets of measurements to identify a change associated with a particular access point in a network of access points; and means for automatically adapting network configuration information associated with the particular access point in a database.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
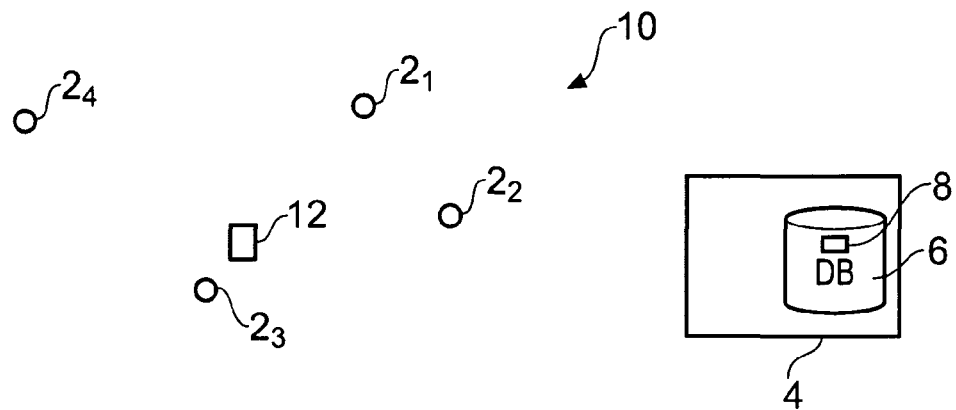
FIG. 1 schematically illustrates an access point network.

FIG. 1 schematically illustrates a wireless network or infrastructure 10 that comprises a number of wireless transceivers $2_1, 2_2, 2_3, 2_4 \ldots 2_n$. The wireless transceivers $2_n$ operate as access points (AP) for the network 10.

The network 10 may be a wireless local area network (WLAN) and the access points $2_n$ may be WLAN access points.

The access point network 10 may be used in positioning an apparatus 12, which may be a mobile apparatus. Although the apparatus 12 communicates with the network of access points 10 it is not part of the network of access points 10.

The Figure also illustrates a server 4 and a database 6. The server 4 facilitates access to the information stored in the database 6. The database 6 stores configuration information 8 of the access point network 10. The configuration information 8 is information that is required to position an apparatus 12 as a result of communication between the apparatus 12 and APs $2_n$.

Figure 2A:
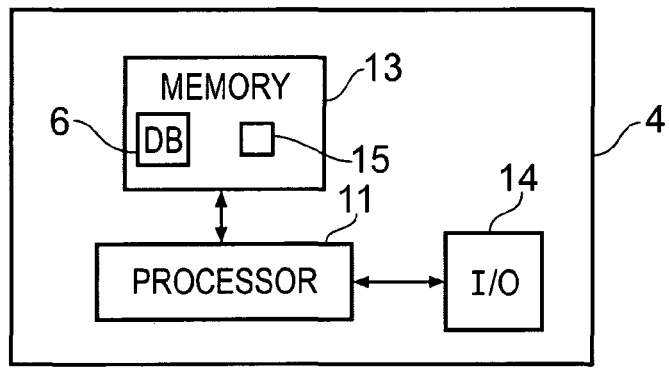
FIG. 2A schematically illustrates one example of a server.

One example of a server 4 is schematically illustrated in FIG. 2A. This server 4 comprises a processor 11, a memory 13 and an input/output interface 14. The memory 13 stores the database 6 and also a computer program 15 which controls the operation of the processor 11. The processor 11 is arranged to write to and read from the memory 13 and to provide data to and receive data from the input/output interface 14. The input/output interface 14 is used to communicate with each of the access points $2_n$. It may be a hard-wired interface such as an Ethernet adapter or it may be a wireless interface such as a WLAN adapter.

Figure 2B:
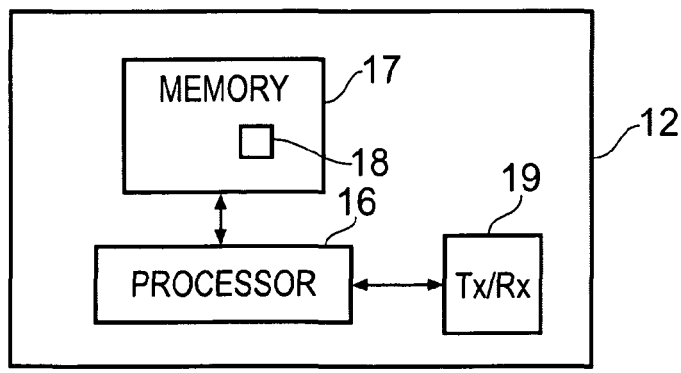
FIG. 2B schematically illustrates one example of an apparatus which is to be positioned.

One example of an apparatus 12 is schematically illustrated in FIG. 2B. This apparatus 12 comprises a processor 16, a memory 17 and a wireless transceiver 19. The memory 17 stores a computer program 18 which controls the operation of the processor 16. The processor 16 is arranged to write to and read from the memory 17 and to provide data to and receive data from the wireless transceiver 19. The wireless transceiver 19 is used to communicate with each of the access points $2_n$. If the access points are WLAN APs then the wireless transceiver 19 is a WLAN transceiver.

Figure 4:
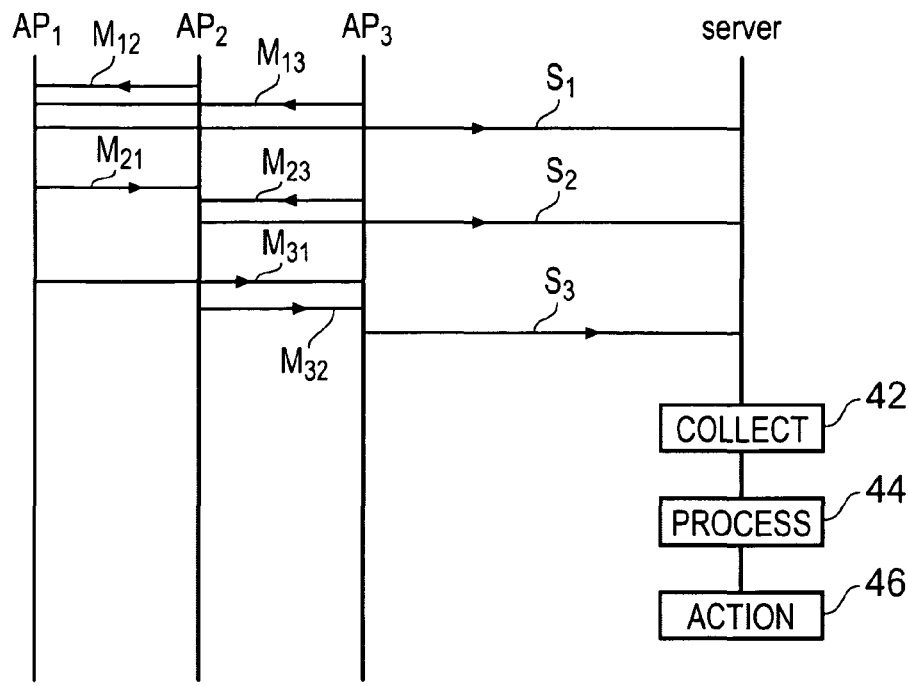
FIG. 4 illustrates a process for detecting a change in the physical configuration of the access point network, classifying the change and performing appropriate actions.
Figure 5:
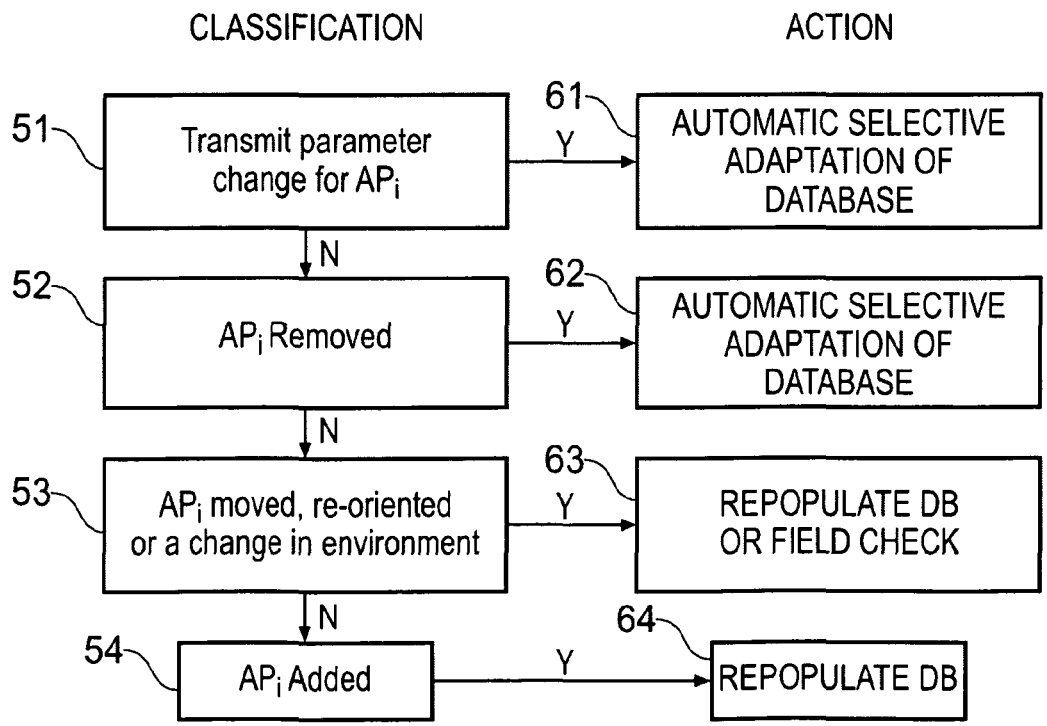
FIG. 5 illustrates an example of how different classifications of network change may be mapped to different respective actions.

The computer program instructions may provide the logic and routines that enable a computer to perform the methods illustrated in FIGS. 4 and 5.

The computer program instructions may arrive at an apparatus 12, 4 via an electromagnetic carrier signal or be copied from a physical entity such as a computer program product, a memory device or a record medium such as a CD-ROM or DVD.

The database 6 and server 4 may be distributed over one or more APs $2_n$ and/or one or more apparatus 12 or they may be provided by one or more separate distinct components as illustrated in FIG. 1. The calculation of the position of the apparatus 12 may occur at an AP $2_n$, at the apparatus 12 or at the server 4.

The configuration information 8 includes the current location of the separate access points $2_n$ and may also include the network addresses of the access points. The configuration information 8 may also include additional information that is dependent upon the algorithm used for positioning the apparatus 12. For example, if positioning is performed on the basis of signal strength measurements, the configuration information 8 may additionally include the transmission power of the AP and perhaps its antenna orientation.

The apparatus 12 communicates with the APs and a communication parameter is measured either at the apparatus 12 or at the access points $2_n$. Knowledge of the positions of the access points $2_n$ and knowledge of the measured parameters are collected at the apparatus $2_n$, 4, 12 where the position of apparatus 12 is determined and used to determine the position of the apparatus 12.

There follows some examples of positioning. In these examples, the positioning is performed by the apparatus 12, however, in other implementations the same positioning methods may be performed by the access point. The positioning methods described measure one of the following parameter types: signal strength measurement, time of arrival measurement and angle of arrival measurement. However other parameter types may also be used for positioning such as bit error rate (BER) or the impulse response (IR) of the radio channel.

Figure 3A:
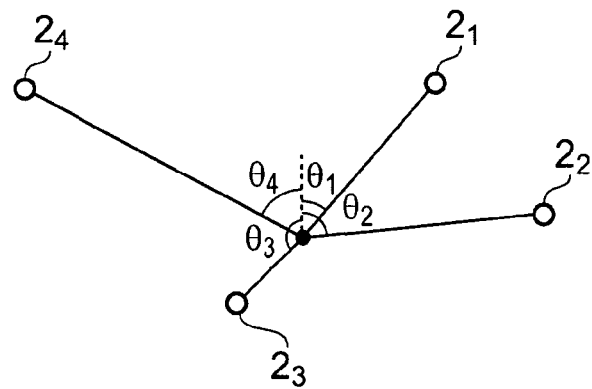
FIG. 3A schematically illustrates a positioning procedure than uses estimates of the angle at which transmissions are received by an apparatus to determine a position of the apparatus.

For example, referring to FIG. 3A, the apparatus 12 detects the angle $\theta_n$ at which transmissions from the nth access point $2_n$ are received. The apparatus 12 receives the positions of the APs $2_n$ from the database 6. It uses this knowledge and the detected angles $\theta_n$ at which transmissions from the access points $2_n$ are received to determine its position using known algorithms.

Figure 3B:
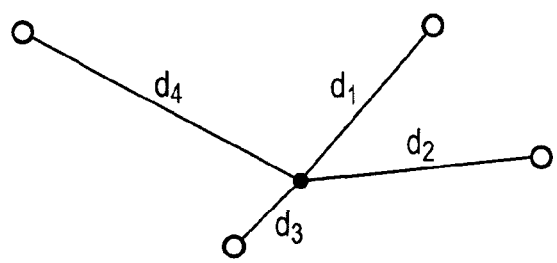
FIG. 3B schematically illustrates a positioning procedure than uses estimates of the distance between an apparatus and access points to determine a position of the apparatus.

For example, referring to FIG. 3B, the apparatus 12 may detect the time of flight for transmissions received from the access points $2_n$. The apparatus 12 receives the positions of the APs $2_n$ from the database 6. It uses this knowledge, the flight times of transmissions from the APs and knowledge of how the flight times vary with distance to determine its position using known algorithms.

For example, referring to FIG. 3B, the apparatus 12 may measure received signal strength for transmissions received from the access points $2_n$. The apparatus 12 receives the positions of the APs $2_n$ from the database 6. It uses this knowledge, the received signal strengths and knowledge of how the received signal strength attenuates with distance to determine its position using known algorithms.

According to another algorithm, the signal strength measurement $p_n$ made at apparatus 12 of transmissions from the nth AP $2_n$ is modeled using an attenuation model $p_n = T_n - PL(d_n)$, where $T_n$ is the power of transmissions by the nth AP $2_n$ and PL is a path loss model that is dependent on the path length $d_n$. The path loss may be modeled as being inversely proportional to the distance $d_o$ between the apparatus 12 and the nth AP $2_n$. In this example, the network configuration information 8 received by the apparatus 12 from the database 6 includes not only the positions of the APs but also their transmission powers $T_n$, and if directional gain antennas are used also the direction of gain (i.e. orientation). Trilateration may be used using to position the apparatus 12.

According to another algorithm, a set of signal strength measurements $\{s_n\}$ of transmissions from the APs $2_n$ is made at each of a number of known locations $L_n$. The known locations and their respective sets $\{s_n\}$ are associated together in a fingerprint database, which may be a part of the database 6. A set of signal strength measurements $\{p_n\}$ of transmissions from the n APs $2_n$ is made at apparatus 12. The set $\{p_n\}$ is matched to one of the sets $\{s_m\}$ and the position of the apparatus 12 is determined as $L_m$. The matching may occur by determining the Euclidian distance $\Sigma s_n^2$ that is closest to $\Sigma p_n^2$.

It is apparent that the integrity of the configuration information 8 in the database 6 is critical for positioning the apparatus 12.

Changes may occur within the access point network 10 that result in the actual configuration of the AP network 10 and the configuration defined by the configuration information 8 being different. The effect of differences may be significant or insignificant. Some differences may be significant for one positioning procedure but not for another different positioning procedure.

The differences may be dealt with by flagging incorrect configuration information 8 in the database 6 so that it is not used or is used with caution or may be dealt with by resolving the difference between the real configuration and the virtual configuration.

Resolution of the differences may occur either by changing the physical configuration of the AP network so that it matches the 'virtual' configuration defined by the configuration information 8 or by changing the configuration information 8 so that the 'virtual' configuration matches the physical configuration of the AP network.

Changing the configuration information 8 so that the 'virtual' configuration matches the physical configuration of the AP network may in some instances require a labor intensive process such as repopulating a fingerprint database or in some instances the database may be automatically selectively adapted.

FIGS. 4 and 5 illustrate processes for detecting a change in the physical configuration of the AP network and performing appropriate action to flag or resolve the change. In other embodiments, the action may include changing the physical configuration of the network 10.

A first access point $AP_1$ transmits with a transmit power $T_1$, a second access Point $AP_2$ transmits with a transmit power $T_2$, and a third access Point $AP_3$ transmits with a transmit power $T_3$.

An access point $AP_n$ makes measurements $m_{nm}$ for transmissions from access points $AP_m$, where m=1, 2 . . . N but m≠n. The measurements $m_{n1}$, $M_{n2}$, $m_{n3}$ . . . , are combined into a set $s_n$ of measurements and sent to the server 4.

Thus, in the illustrated example, the first access Point $AP_1$ makes a measurement $m_{12}$ in respect of transmit power $T_2$ of the second access point $AP_2$ and makes a measurement $m_{13}$ in respect of transmit power $T_3$ of the third access point $AP_3$. The measurements $m_{12}$ and $m_{13}$ are combined into a set $s_i$ of measurements and sent to the server 4.

The second access Point $AP_2$ makes a measurement $m_{21}$ in respect of transmit power $T_1$ of the first access point $AP_1$ and makes a measurement $m_{23}$ in respect of transmit power $T_3$ of the third access point $AP_3$. The measurements $m_{21}$ and $m_{23}$ are combined into a set $s_2$ of measurements and sent to the server 4.

The third access Point $AP_3$ makes a measurement $m_{32}$ in respect of transmit power $T_2$ of the second access point $AP_2$ and makes a measurement $m_{31}$ in respect of transmit power $T_1$ of the first access point $AP_1$. The measurements $m_{32}$ and $m_{31}$ are combined into a set $s_3$ of measurements and sent to the server 4.

The measurements $m_{ij}$ in one embodiment are received signal strength (RSS) measurements. Each RSS measurement $m_{ij}$ may include a mean value $p_{ij}$ and a standard deviation from the mean $\sigma_{ij}$. The measurements $m_{ij}$ may be made according to a schedule e.g. once a day. The measurements $m_{ij}$ made may always be sent to the server 4 or may only be sent if they differ significantly from the previous measurement or the average of the last few measurements.

The server 4, at block 42, collects a set of measurements $s_n$ for each of access point $AP_n$.

The server 4, at block 44, processes the sets of measurements to identify and classify changes between measurements $m_{ij}(t)$ and previous measurements $m_{ij}(t-T)$.

The server 4, at block 46, performs an action that is dependent upon the classification of the change.

A change indicates an inconsistency between the real configuration of the AP network 10 and the virtual configuration of the AP network defined by the configuration information 8. The classification of an action enables different remedial actions to be performed for different types of changes.

An action may, for example, cause a change in the real configuration of the access point network so that the real configuration of the AP network is made consistent with the virtual configuration of the AP network An action may, for example, flag the inconsistency. For example, if the change is associated with a particular AP, then the action may flag in the database 6 some or all of the configuration data 8 associated with that access point as unreliable.

An action may, for example, cause a change in the virtual configuration of the access point network so that the virtual configuration of the AP network is consistent with the real configuration of the AP network. For example, if the change is a quantifiable change associated with a particular AP, then the action may adapt in the database 6 the configuration information 8 associated with that particular access point to reflect the quantifiable change. For example, if the change is not a quantifiable change, then the action may result in repopulation of the database 6 so that it is consistent with the current configuration of the AP network.

FIG. 5 illustrates an example of how different classifications 51, 52, 53, 54 may be mapped to different respective actions 61, 62, 63, 64. The different respective actions may be performed with different urgency. That is there may be a significant delay before some actions are performed whereas other actions may be performed immediately.

If it is determined at block 51 that a transmit parameter such as transmit power has changed for an access point, then the database 6 is automatically and selectively adapted at block 61. The selective adaptation may involve flagging the transmit data for the access point as inaccurate or changing the transmit power value for the access point to the new value.

It can, for example, be determined that the transmit power $T_i$ of access point $AP_i$ has changed when $$p_{ni}(t) \neq p_{ni}(t-T) \text{ for all/most } n.$$

$$p_{in}(t) \sim p_{in}(t-T) \text{ for all/most } n$$

The quantitative value of $T_i(t)$ may be calculated from $$p_{mi}(t) - p_{im}(t) = T_i(t) - T_m(t)$$

if $T_m(t)$ is known.

As $p_{mi} = T_i + G_i - PL_{mi} + G_m$ where $G_i$ is antenna gain at $AP_i$ and $PL_{mi}$ is the path loss at $AP_m$ from $AP_i$ which is the same as the path loss $PL_{im}$ at $AP_i$ from $AP_m$ then $p_{mi}(t) - p_{im}(t) = T_i + G_i - PL_{mi} + G_m - (T_m + G_m - PL_{im} + G_i) = T_i - T_m$.

Alternatively, the quantitative value of the change Δ in $T_i(t)$ may be calculated as follows:

$$\text{let } a = p_{mi}(t) - p_{im}(t) = T_i(t) - T_m(t)$$

$$\text{let } b = p_{mi}(t-T) - p_{im}(t-T) = T_i(t-T) - T_m(t-T)$$

as $T_m(t) = T_m(t-T)$ but $T_i(t) \neq T_i(t-T)$, then $$\text{then } \Delta = T_i(t) - T_i(t-T) = b - a$$

If it is determined at block 52 that an access point has been removed from the network of access points, then the database 6 is automatically and selectively adapted at block 62. The selective adaptation may involve flagging the data associated with the access point as inaccurate or removing the data associated with the access point.

It can, for example, be determined that the access point $AP_i$ has been removed when $p_{ni}(t-T) \neq 0$, $p_{ni}(t) \sim 0$ for all/most $n$.

$p_{in}(t-T) \neq 0$, $p_{in}(t) \sim 0$ for all/most $n$

If it is determined at block 53 that an access point has been moved or reoriented or its environment has changed, then the database 6 may be repopulated at block 63 so that the virtual configuration accurately reflects the real configuration.

It can, for example, be determined that the access point $AP_i$ has been moved, reoriented or its environment has changed when:

$p_{ni}(t) \neq p_{ni}(t-T)$ for all/most $n$.

$p_{in}(t) \neq p_{in}(t-T)$ for all/most $n$

It may also be possible to discriminate between a change in position, a change in orientation and a change in environment.

For example, if we define the set of access points X for which $p_{ni}(t) > p_{ni}(t-T) + \epsilon$ and define the set of access points Y for which $p_{mi}(t) < p_{mi}(t-T) - \epsilon$, then:

If there is only a change in position, the positions of set X and the positions of set Y should cluster on either side of the previous position of $AP_i$.

In the event that the change is classified as a position change of an access point $AP_i$, it may be possible to calculate the new position of $AP_i$ using the set of measurements $p_{im}(t)$ and an attenuation model with trilateration. The new position could also be calculated using angle of arrival measurements or time-of-flight measurements.

If there is only a change in orientation of directional gain, the positions of set X and the positions of set Y should cluster adjacent one another.

If there is only a change in environment, it is likely that only the positions of set X or set Y will cluster and it may be unlikely that both will cluster.

If it is determined at block 54 that an access point has been added, then the database 6 may be repopulated at block 64 so that the virtual configuration accurately reflects the real configuration.

The discrimination between changes in position, orientation or environment may also be achieved using angle of arrival measurements. If there is a change in power angular profile (measured powers as a function of angle of arrival) that the peaks of the profile remain at the same angles, but the power levels change that could be an indication of re-orientation or environment change. If the angles of the peak powers change then there has been re-location.

When the database 6 is adapted, for example, selectively or by repopulation, then the new entries may be time stamped. When positioning occurs only the more recent entries of the database may be downloaded to an apparatus 12 or used by the apparatus that is running the positioning algorithm. Alternatively, differential weighting may be used so that the more recent entries have a greater influence on the result of a positioning algorithm.

The blocks illustrated in the FIGS. 4 and 5 may represent steps in a method and/or sections of code in the computer program. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
    collecting from each of first multiple access points in a network of access points a set of measurements, each said set of measurements being made at a respective one of the first multiple access points as a result of the respective one of the first multiple access points receiving signals transmitted by other ones of the first multiple access points, wherein the first multiple access points are configured for use in positioning a device that communicates with but is not part of the network of access points;
    processing the collected sets of measurements to classify changes that have occurred indicating an inconsistency between configuration of the network of access points and stored configuration information, wherein classification comprises identifying a change as consequent on one of: access point position change, access point orientation change, access point transmission power change, access point addition or access point removal; and
    performing an action that is conditional upon how a change is classified.

2. A method as claimed in claim 1, wherein classification depends upon any one of the following: a parameter type measured by the measurements and patterns of change in the measurements.

3. A method as claimed in claim 1, wherein classification comprises processing the collected sets of measurements to identify a change in the network of access points associated with a particular access point.

4. A method as claimed in claim 1, wherein classification comprises detecting when all or most measurements made at access points resulting from transmissions by a first access point change but all or most measurements made by the first access point do not change.

5. A method as claimed in claim 1, wherein action includes maintaining the integrity of a database that records configuration information of the access point network, wherein the database is configured for use in positioning an apparatus that communicates with the access point network.

6. A method as claimed in claim 1, wherein the action includes automatically adapting the configuration information associated with a particular access point in the database.

7. A method as claimed in claim 1, wherein the action includes automatically adapting the configuration information in the database to record a calculated change in a transmission power of an access point.

8. A method as claimed in claim 1, wherein the action includes automatically adapting the configuration information in the database to remove data associated with a particular access point.

9. A method as claimed in claim 1, wherein the action includes flagging to indicate that an action is required.

10. An apparatus comprising:
at least one memory; and
at least one processor configured to cause the apparatus to:
collect from each of first multiple access points in a network of access points a set of measurements, each said set of measurements being made at a respective one of the first multiple access points as a result of the respective one of the first multiple access points receiving signals transmitted by other ones of the first multiple access points, wherein the first multiple access points are configured for use in positioning a device that is configured to communicate with but is not part of the network of access points;
process the collected sets of measurements to classify changes that have occurred indicating an inconsistency between configuration of the network of access points and stored configuration information, wherein classification comprises identifying a change as consequent on one of: access point position change, access point orientation change, access point transmission power change, access point addition or access point removal; and
perform an action that is conditional upon how a change is classified.

11. An apparatus as claimed in claim 10, wherein the at least one memory and the at least one processor are configured to cause the apparatus to process the collected sets of measurements to identify a change in the network of access points associated with a particular access point.

12. An apparatus as claimed in claim 10, wherein the at least one memory and the at least one processor are configured to cause the apparatus to process the collected sets of measurements to detect when all or most measurements made at access points resulting from transmissions by a first access point change but all or most measurements made by the first access point do not change.

13. An apparatus as claimed in claim 10, wherein the at least one memory and the at least one processor are configured to cause the apparatus to process the collected sets of measurements to detect when all or most measurements made at access points resulting from transmissions by a first access point change and all or most measurements made by the first access point change.

14. An apparatus as claimed in claim 10, wherein the at least one memory and the at least one processor are configured to cause the apparatus to maintain integrity of a database that records configuration information of the access point network, wherein the database is configured for use in positioning an apparatus that communicates with the access point network.

15. An apparatus as claimed in claim 14, wherein the at least one memory and the at least one processor are configured to cause the apparatus to automatically adapt the configuration information in the database associated with a particular access point.

16. An apparatus as claimed in claim 14, wherein the at least one memory and the at least one processor are configured to cause the apparatus to automatically adapt the configuration information in the database to record a calculated change in the transmission power of an access point.

17. A system comprising:
first multiple access points for use in positioning a device that communicates with but is not part of the network of access points;
means for collating for each of first multiple access points in the network of access points a set of measurements, each said set of measurements being made at a respective one of the first multiple access points as a result of the respective one of the first multiple access points receiving signals transmitted by other ones of the first multiple access points;
means for processing the collated sets of measurements to classify changes that have occurred indicating an inconsistency between configuration of the network of access points and stored configuration information, wherein classification comprises identifying a change as consequent on one of: access point position change, access point orientation change, access point transmission power change, access point addition or access point removal; and
means for performing an action that is conditional upon how a change is classified.

18. A non-transitory memory having a computer program comprising program instructions stored thereon which when run on a processor of a device causes the device to:
collect from each of first multiple access points in a network of access points a set of measurements, each said set of measurements being made at a respective one of the first multiple access points as a result of the respective one of the first multiple access points receiving signals transmitted by other ones of the first multiple access points, wherein the first multiple access points are configured for use in positioning a device that communicates with but is not part of the network of access points;
process the collected sets of measurements to classify changes that have occurred indicating an inconsistency between configuration of the network of access points and stored configuration information, wherein classification comprises identifying a change as consequent on one of: access point position change, access point orientation change, access point transmission power change, access point addition or access point removal; and
perform an action that is conditional upon how a change is classified.

19. A server comprising an apparatus as claimed in claim 10.

* * * * *